(No Model.)

W. JOHNSON.
CENTRIFUGAL SEPARATOR.

No. 601,377. Patented Mar. 29, 1898.

WITNESSES
E. A. Guild
J. M. Dolan.

INVENTOR
William Johnson
by Edgar O. G. Coale
his attorney

UNITED STATES PATENT OFFICE.

WILLIAM JOHNSON, OF BOSTON, MASSACHUSETTS.

CENTRIFUGAL SEPARATOR.

SPECIFICATION forming part of Letters Patent No. 601,377, dated March 29, 1898.

Application filed March 1, 1897. Serial No. 625,563. (No model.)

*To all whom it may concern:*

Be it known that I, WILLIAM JOHNSON, of Boston, in the county of Suffolk and State of Massachusetts, have invented a new and useful Improvement in Centrifugal Separators, of which the following is a specification.

My improvement is intended more especially as a household utensil of simple construction to separate cream from milk. It consists of a rotatable drum secured to a spindle, said drum having a concavo-convex upper wall provided with a central opening and a bottom wall shaped to form a central chamber and a peripheral annular chamber, narrow at its upper inner portion, where it communicates with the central chamber, and gradually increasing in width upwardly and downwardly to the periphery of the drum, and separate draw-off devices for the two chambers adapted to remain closed during the rotation of the drum.

This improvement will be understood by reference to the drawings, in which—

Figure 1:
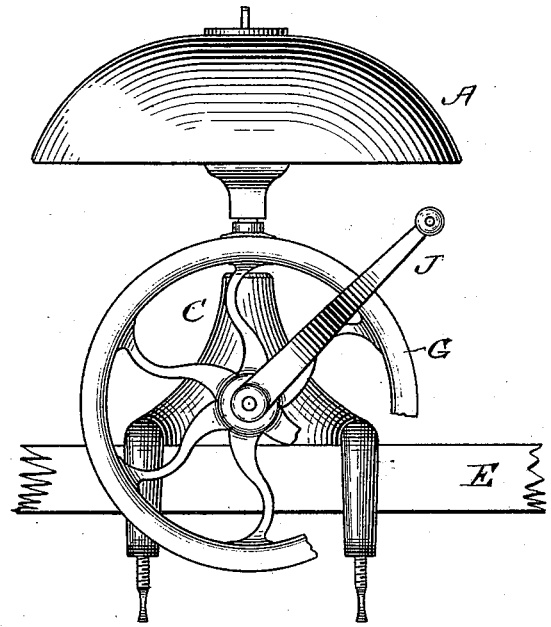
Figure 2:
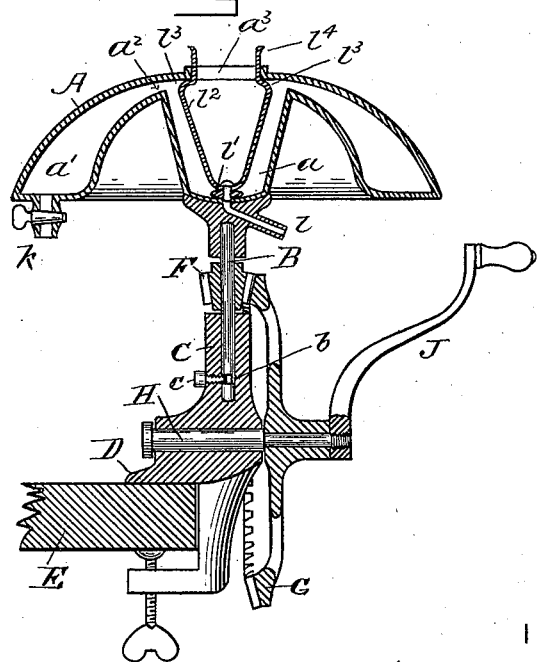

Figure 1 is a side elevation, and Fig. 2 a vertical section, of a separator embodying my invention.

A is a drum, which is of substantially the shape shown, its upper wall being concavo-convex and its lower wall being shaped to form a central chamber $a$ and a peripheral chamber $a'$, the peripheral chamber being wider at the bottom than at the top and being connected at the top to the central chamber by a narrow annular passage $a^2$.

$a^3$ is a central opening in the concavo-convex wall of the drum.

The drum is mounted on a central shaft B, set into a socket C, formed in the base D of the machine. I prefer to construct the base in the form of a bracket adapted to be suitably clamped or otherwise attached to a shelf or table E or other means of support. This casing may be rotated in any convenient way. As shown, the shaft B is provided with a gear F, which engages with a larger gear G, mounted on the shaft H, which turns in the base D. One end of this shaft is provided with a crank-handle J. The shaft B may be held in place in any convenient way—for example, by a groove $b$ and set-screw $c$, as shown. $k$ is a faucet by which to draw off the milk from the chamber $a'$.

$l$ is an outlet from the chamber $a$, which is closed by means of a valve $l'$, attached to the lower end of a loop-spring $l^2$, made of wire or the like. This spring $l^2$ has two shoulders $l^3$ $l^3$ and finger-pieces $l^4$, the shoulders engaging under the rim of the opening $a^3$. By compressing the finger-pieces $l^4$ the shoulders $l^3$ $l^3$ may be released and the valve may be lifted off its seat. This loop-spring $l^2$ is shown in section in Fig. 2, but in fact may be made of wire of small diameter, so that it will not interfere with the free circulation of milk or other liquid with which the separator is used.

The chamber $a'$ should hold a somewhat less quantity of liquid than the central chamber $a$, and in practice when the milk is poured into the chamber $a$ and the drum rotated the heavier particles will be thrown out into the chamber $a'$, perhaps carrying with them a portion of the lighter particles; but as the rotation continues centrifugal force will act to throw the heavier particles against the outer wall of the chamber $a'$, and thus release the lighter particles, so that they will be retained in the upper part of the central chamber $a$ until the separator stops, when they will fall down into the central chamber $a$, from which they may be drawn—for example, as cream—through the nozzle $l$ by compressing the finger-pieces $l^4$ and removing the valve $l'$.

I am aware of United States patent to Bond, No. 286,769, dated October 16, 1883, and disclaim the invention therein described.

What I claim as my invention is—

1. In a rotary separator, a rotatable spindle having a drum mounted thereon containing two chambers, one a peripheral chamber wider at the bottom than at the top, the outer wall of said chamber sloping upward and inward toward the axis of the drum and a central chamber, said chambers being connected by a narrow passage near their upper portions and each chamber being provided with an outlet adapted to remain closed during the rotation of the separator, all substantially as and for the purposes set forth.

2. In a rotary separator, a rotatable spindle, a drum mounted thereon and adapted to be rotated therewith, said drum containing two chambers, one a peripheral chamber wider at the bottom than at the top, its outer wall sloping upward and inward toward the axis of the drum, and a central chamber of greater capacity than said peripheral chamber and connected thereto near its top, each chamber being provided with an outlet adapted to remain closed during the rotation of the separator, all as set forth.

In witness whereof I have hereunto set my name this 24th day of February, 1897.

WILLIAM JOHNSON.

Witnesses:
GEORGE O. G. COALE,
E. A. GUILD.